United States Patent [19]
Dallos

[11] 4,149,110
[45] Apr. 10, 1979

[54] BRIGHTNESS CONTROLLED CRT

[75] Inventor: Andras Dallos, Lincoln, Mass.

[73] Assignee: Raytheon Company, Lexington, Mass.

[21] Appl. No.: 891,238

[22] Filed: Mar. 29, 1978

[51] Int. Cl.² .......................................... H01J 29/98
[52] U.S. Cl. .................................... 315/107; 315/10; 315/158; 315/291; 315/307; 358/219
[58] Field of Search ................. 315/10, 94, 106, 107, 315/156, 158, 291, 307; 358/219

[56] References Cited
U.S. PATENT DOCUMENTS

| | | | |
|---|---|---|---|
| 3,885,194 | 5/1975 | Schumacher | 315/107 |
| 3,909,662 | 9/1975 | Thomas et al. | 315/106 |
| 3,909,663 | 9/1975 | Thomas et al. | 315/106 |

*Primary Examiner*—Eugene R. LaRoche
*Attorney, Agent, or Firm*—John T. Meaney; Joseph D. Pannone; Harold A. Murphy

[57] ABSTRACT

A cathode ray tube control system comprising a cathode ray type tube having a tubular envelope wherein an electron gun is disposed to direct an electron beam onto a spaced anode target screen, the gun including an electron emitting source aligned with an adjustably biased grid means for controlling the current level of the electron beam, and external circuit means connected to the grid means and to the source for adjusting the current level of the electron beam and the electron emission capability of the source correspondingly.

15 Claims, 4 Drawing Figures

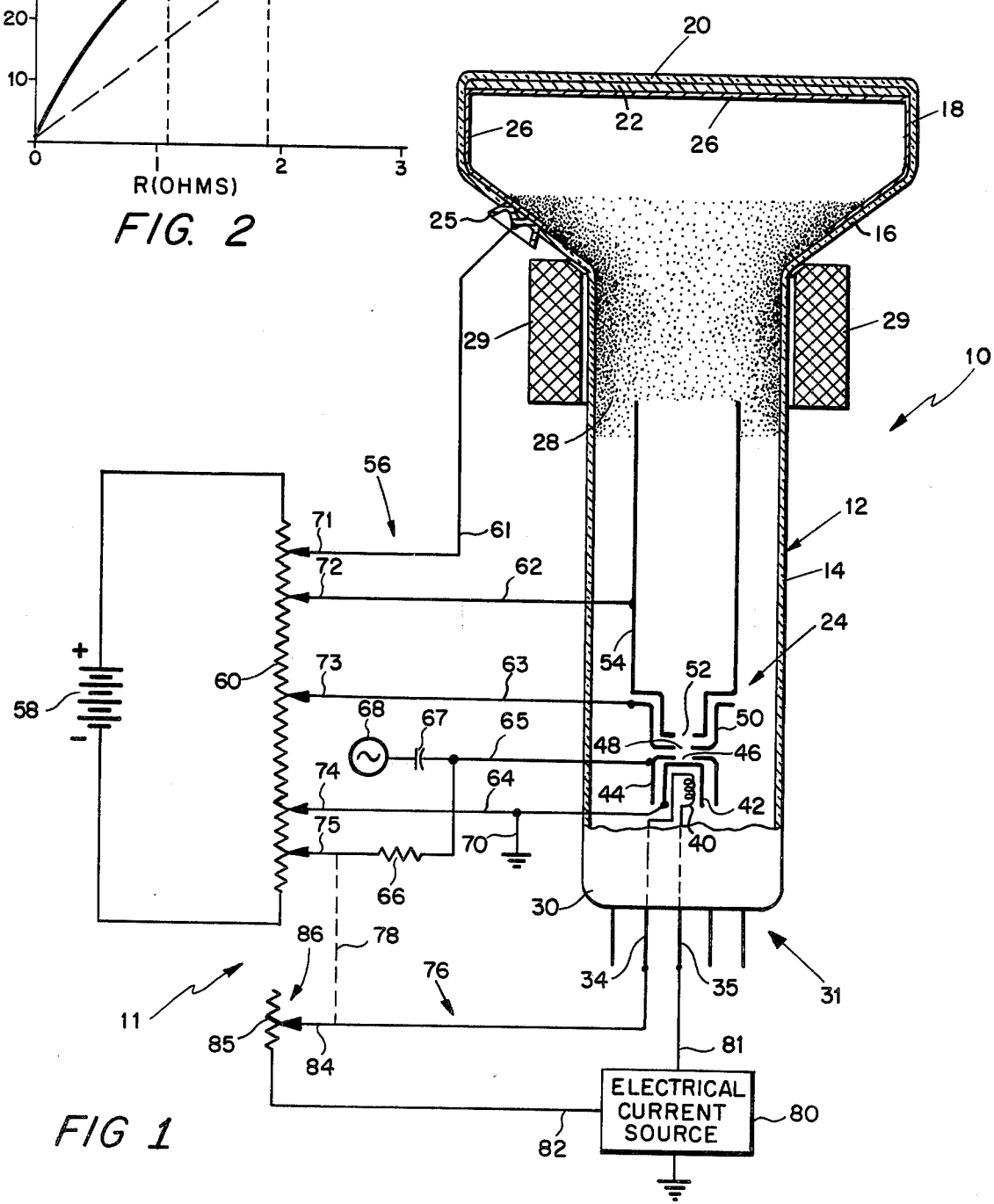

BRIGHTNESS CONTROLLED CRT

BACKGROUND OF THE INVENTION

1. Field of the Invention.

This invention relates generally to cathode ray tube control systems and is concerned more particularly with a cathode ray type tube connected to control circuitry having means for varying cathode emission capability in accordance with adjustments in electron beam current level.

2. Discussion of the Prior Art.

A display tube of the cathode ray type generally comprises a tubular envelope having therein an electron gun disposed to direct an electron beam onto a spaced anode imaging screen adjacent a transparent faceplate of the tube. The electron gun usually includes a heated cathode aligned with a spaced control grid electrode and with further spaced beam-focusing electrodes. In operation, the cathode is heated to a predetermined temperature for emitting a copious supply of electrons which pass through the control grid electrode, in accordance with the biasing potential thereof, and are beamed onto a discrete area of the imaging screen. An electromagnetic yoke may be disposed about a portion of the envelope adjacent the exit end of the gun for establishing a variable magnetic field which deflects the electron beam over successive discrete areas of the imaging screen in scanning a well-known raster pattern thereon.

The imaging screen generally comprises a layer of phosphor material which fluoresces locally to produce a spot of visible light when a discrete region thereof is penetrated by electrons from the beam. Consequently, when scanned by the electron beam, the imaging screen produces a visible light display of the raster pattern, which is viewable through the adjacent faceplate of the tube. Each discrete portion of the display pattern has a brightness proportional to the value of electron current impinging on the associated discrete area of the imaging screen. Thus, by suitably modulating the current level of the electron beam during the scanning operation, informational data may be "written" in the display pattern produced by the imaging screen and viewed through the adjacent faceplate of the tube.

Generally, the steady-state value of electron beam current is controlled by adjusting the biasing potential of the control grid adjacent the cathode of the gun. Accordingly, a modulating signal voltage may be applied between the cathode and the control grid for altering the electron current of the beam in the desired manner for "writing" informational data in the display pattern. If the informational data cannot be easily read through the adjacent faceplate, the biasing potential of the control grid may be adjusted to increase the steady-state value of electron beam current passing through it from the cathode. Thus, the electron beam will produce on the imaging screen a display pattern which is brighter with respect to the ambient illumination environment and more readily viewable through the adjacent faceplate of the tube.

If the ambient illumination conditions change to a higher level, such as from moonlight to daylight, for example, the brightness of the display pattern on the imaging screen relative to the illumination environment will decrease. In order to restore the relative brightness of the display pattern, the biasing potential of the control grid may be adjusted to increase the steady-state value of electron current passing through it still further. Consequently, in operation, the cathode usually is maintained at a sufficiently high temperature for constantly supplying the copious electron emission required to obtain an adequately bright image in a specified maximum illumination environment. However, maintaining the cathode at relatively high operating temperatures increases the rate at which materials from the cathode coating and the base metal sublimate, thereby causing depletion of electron emission capability and development of other undesirable effects, such as grid emission and interelectrode leakage currents, for examples. Consequently, since the tube generally is not operating constantly under maximum illumination conditions, the electron emitting capacity of the cathode is depleted more rapidly than necessary; and the operational life of the tube is shortened considerably.

Therefore, it is advantageous and desirable to provide a cathode ray tube control system with a cathode ray type tube connected to control circuitry having means for preserving the operational life of the tube.

SUMMARY OF THE INVENTION

Accordingly, this invention provides a cathode ray tube control system comprising a cathode ray type tube having an evacuated envelope wherein an electron gun is disposed for directing an electron beam onto a spaced anode target screen. The gun includes an electron emitting source aligned with spaced grid means for controlling the current level of the electron beam, and with a further spaced series of beam-focusing and electron accelerating electrodes. The system also includes control circuitry disposed externally of the tube and electrically connected to electrode elements thereof. The circuitry includes variable voltage supply means connected between the grid means and the electron source for adjusting the current level of the electron beam, and adjustable current supply means connected to the electron emitting source for adjusting its electron emission capability. The adjustable current supply means is coupled to the variable voltage supply means through sensing means for measuring adjustments in the current level of the electron beam and adjusting the electron emission capability of the electron emitting source accordingly.

A preferred embodiment of the invention comprises a cathode ray type of display tube having a tubular envelope wherein an electron gun is disposed for directing an electron beam onto an anode target imaging screen adjacent a transparent faceplate end of the envelope. The electron emitting source comprises an indirectly heated cathode disposed adjacent a filamentary heater and aligned with a spaced control grid, which is aligned with a series of beam forming and electron accelerating electrodes. The control circuitry includes a variable voltage source having an adjustable member electrically connected between the cathode and the control grid for adjusting the current level of the electron beam, and a variable current source connected to the heater element of the electron emitting source through an effective portion of a resistive element and a slidably contacting adjustable member. The sensing means comprises mechanical means for coupling the adjustable member of the current source to the adjustable member of the voltage source such that an adjustment in the biasing potential of the control grid causes a similar adjustment in the current supplied to the heater element. Preferably, the biasing potential of the control grid varies approximately logarithmically with the effective portion of the resistive element varyng substantially linearly. As a result, the temperature of the cathode and the electron emission capability thereof is adjusted in a manner corresponding to the adjustment in current level of the electron beam.

A first alternative embodiment is similar to the preferred embodiment except the adjustable members are not mechanically coupled to one another. Instead the variable current source is connected to the output of a sensing means comprising a comparator having one input connected to a reference voltage source and another input connected through an amplifier to a beam current level determining means. The determining means comprises a parallel resistor-capacitor network connected to the cathode for electrically measuring the current level of the electron beam. A voltage signal derived from the measured current level is compared with a reference voltage signal in the comparator to produce an output control signal voltage for the variable current source. Thus, a change in the measured current level produces a corresponding change in the control signal voltage which adjusts the current supplied by the variable current source to the heater element of the electron emitting source. As a result, the temperature of the cathode and the electron emission capability thereof is adjusted in a manner corresponding to the adjustment in current level of the electron beam.

A second alternative embodiment is similar to the first alternative embodiment except the sensing means is connected between the adjustable member of the variable voltage source and the control grid electrode. The sensing means, in this embodiment, comprises light sensitive means, such as a photoelectric transducer, for example, disposed to sense changes in the ambient illumination from the environment and produce two corresponding electrical output signals. One of the output signals adjusts the biasing potential of the control grid to vary the current level of the electron beam in a manner that will alter the brightness of the display pattern on the imaging screen to compensate for the measured change in ambient illumination. The other output signal of the light sensitive means is compared with a reference voltage signal in the comparator to produce an output control signal voltage for the variable current source. As a result, the output control signal voltage adjusts the current supplied to the heater element in a manner similar to that described for the first alternative embodiment and the preferred embodiment.

BRIEF DESCRIPTION OF THE DRAWINGS

For a better understanding of the invention, reference is made in the following detailed description to the accompanying drawings wherein:

FIG. 1 is a schematic view of a cathode ray tube control system embodying the invention;

FIG. 2 is a graphical view of a preferred relationship between changes in control grid bias and heater current in connection with the embodiment shown in FIG. 1;

DESCRIPTION OF THE PREFERRED EMBODIMENT

Figure 4:
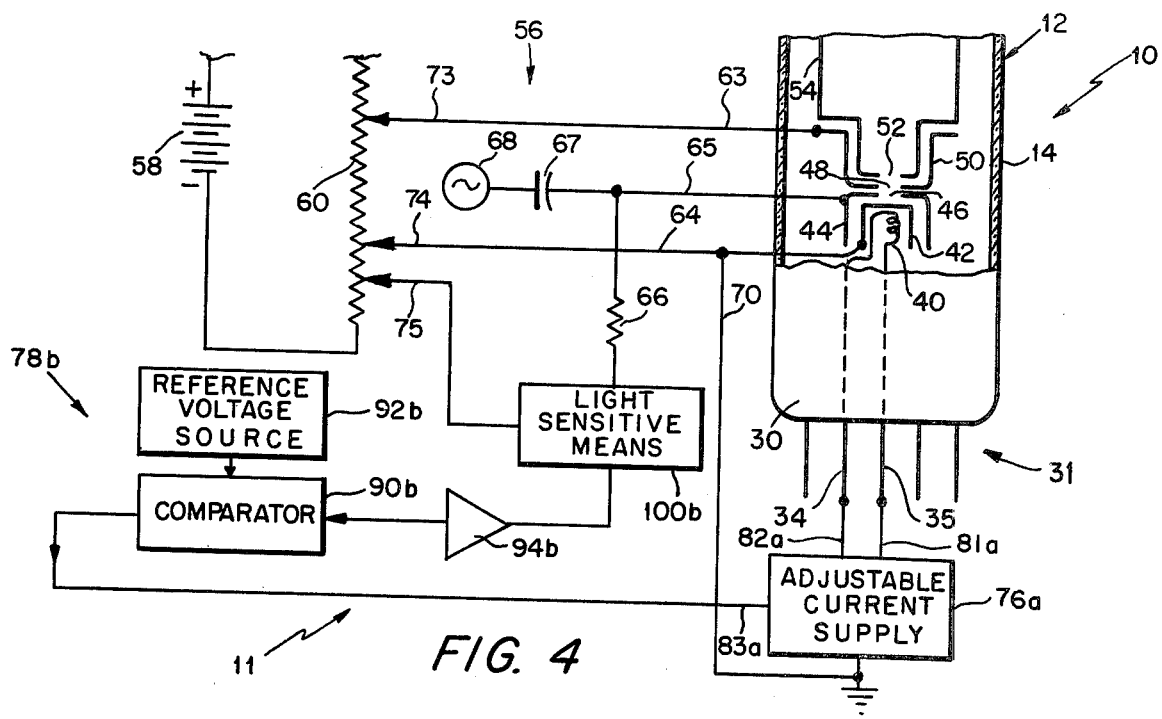
FIG. 4 is a fragmentary schematic view of a second alternative embodiment of the invention.

Referring to the drawings wherein like characters of reference designate like parts, there is shown in FIG. 1 a cathode ray tube control system comprising a cathode ray type display tube 10 connected to external circuitry 11. The tube 10 comprises an evacuated tubular envelope 12 having a neck end portion 14 integrally joined by means of an outwardly flared intermediate portion 16 to a larger diameter end portion 18 of the envelope. Portion 18 of envelope 12 terminates in a peripherally sealed faceplate 20 made of transparent material, such as glass, for example.

Disposed on the inner surface of faceplate 20 is an anode target imaging screen 22 comprising a layer of fluorescent material, such as zinc sulfide, for example. The imaging screen 22 fluoresces locally to produce a spot of visible light when a discrete region thereof is penetrated by electrons beamed from an electron gun 24 axially disposed in neck end portion 14 of envelope 12. A conventional electromagnetic yoke 29 may be disposed about a portion of the envelope adjacent the exit end of gun 24 for establishing a transverse variable magnetic field which causes the beam emanating from gun 24 to scan over successive discrete areas of the imaging screen 22 in a well-known raster pattern. As a result, the imaging screen 22 displays a visible light image of the scanned raster pattern, which may be viewed through the adjacent faceplate 20 of tube 10. Thus, it may be seen that by suitably modulating the electron current level of the scanning beam information data may be "written" in the display pattern produced by the imaging screen 22 and viewed through the faceplate 20.

A thin coating 26 of conductive material, such as aluminum, for example, may be disposed on the inner surface of imaging screen 22 and on the inner cylindrical surface of larger diameter portion 18 of envelope 12. The coating 26 extends axially and annularly onto the inner cylindrical surface of intermediate portion 18 and is electrically connected to a terminal button 25 hermetically sealed in the wall thereof. Terminal button 25 and conductive coating 26 are electrically connected to a thin cylindrical coating 28 of conductive material, such as carbon, for example. The coating 28 extends axially and annularly into the neck end portion 14 of envelope 12 and terminates in radially spaced coaxial relationship with the exit end portion of electron gun 24. Thus, the terminal button 25 provides electrical means for maintaining an anode electrode comprising conductive coatings 26 and 28, respectively, and imaging screen 22 at a suitable electrical potential for accelerating electrons in the beam emanating from gun 24 onto the imaging screen.

Neck end portion 14 terminates at the other end of envelope 12 in a peripherally sealed stem press 30 having extended hermetically through it an array 31 of spaced terminal pins. Although electrical connections to the electrodes of gun 24 are shown as extending directly through the envelope 12 for purposes of clarity, it is to be understood that these electrical connections are made through respective pins of the array 31. For example, terminal pins 34 and 35 of the array 31 may be connected electrically to respective end portions of a filamentary heater element 40 which is supported within an oxide coated cathode cup 42 of the conventional type. Thus, by means of the respective terminal pins 34 and 35, an electrical current may be passed through the heater element 40 to heat the cathode cup 42 up to a suitable temperature for copiously emitting electrons. Accordingly, heater element 40 and cathode cup 42 constitute an electron emitting source for the gun 24.

The cathode cup 42 is disposed insulatingly within a first grid cup electrode 44, and has its closed end positioned adjacent an aperture 46 centrally located in the closed end of a second grid cup electrode 44. Aperture 46 is aligned with a larger diameter aperture 48 centrally disposed in an adjacent closed end of a second grid cup 50, which is insulatingly spaced from the first grid cup 44. Aligned with the aperture 48 is a larger diameter aperture 52 centrally disposed in an adjacent closed end of a hollow focusing cylinder electrode 54 which extends insulatingly into the second grid cup 50. The focusing cylinder 54 extends axially within the neck end portion 14 and has an opposing open end portion which constitutes the exit end portion of gun 24. The exit end portion of gun 24 is disposed coaxially within the adjacent end portion of anode conductive coating 28 and adjacent the entrance end of electromagnetic yoke 29.

The first grid cup 44 constitutes the control grid means of gun 24 and usually is biased negatively with respect to the cathode cup 42 for regulating the flow of electrons therefrom into the beam impinging on imaging screen 22. Consequently, electrons emitted from cathode cup 42 are directed to a cross-over region located approximately between the apertures 46 and 48, respectively. As a result, the electrons passing through the cross-over region enter the second grid cup 50 in a diverging beam. The second grid cup 50 and the focusing cylinder 50 generally are maintained at respective progressively higher positive potentials with respect to the cathode. As a result, the second grid cup 50 and the focusing cylinder 54 function, in conjunction with the still higher positive potential of the anode electrode, to convert the diverging beam into a converging beam which is focused on a discrete area of the imaging screen 22. Thus, the control grid cup 44, second grid cup 50, focusing cylinder 54 and the anode electrode comprising respective coatings 26 and 28 constitute beam-forming electrodes which are axially aligned with the electron emitting source of the gun 24.

Accordingly, the external control circuitry 11 may include variable voltage supply means 56 comprising a polarized voltage source 58 electrically connected across a potentiometer resistive element 60. Consequently, there is established along the resistive element 60 a graduated series of voltage values which decrease progressively from the end portion of resistive element 60 connected to the positive terminal of source 58 to the end portion of element 60 connected to the negative terminal thereof. The anode terminal button 25 of tube 10 may be electrically connected through a conductor 61 and an adjustable tap 71 to the electrically positive end portion of resistive element 60. Thus, the tap 71 may be adjusted to maintain the anode electrode of tube 10 at a suitable electron accelerating potential, such as ten to twenty kilovolts, for example, with respect to the potential of cathode cup 42. Similarly, the focusing cylinder 54 and the second grid cup 50 may be electrically connected through respective conductors 61–63 and adjustable taps 71–73 to progressively less positive portions, of the resistive element 60. Thus, the focusing cylinder 54 and the second grid cup 50 may be maintained at suitable beam-focusing potentials, such as two to four kilovolts and five hundred volts, respectively, for example, relative to the potential of cathode cup 42. The cathode cup 42 may be electrically connected through a conductor 64 and an adjustable tap 74 to a portion of the resistive element 60 which is connected to electrical ground through a conductor 70. However, the conductors 61–64 need not be electrically connected to the associated portions of resistive element 60 through the adjustable taps 71–74, respectively, but alternatively may be connected thereto by other means, such as fixed taps, for example.

The control grid 44 is electrically connected through a conductor 65 and a resistor 66 to an adjustable tap 75 which slidably contacts a portion of resistive element 60 connected between the electrically grounded cathode tap 74 and the end portion of element 60 connected to the negative terminal of source 58. Thus, the grid cup 44 is maintained at a negative bias potential with respect to the potential of cathode cup 42 for controlling the steady-state electron current allowed to pass from cathode cup 42 into the beam impinging on imaging screen 22. Consequently, the tap 75 may be adjusted to provide the beam with a steady-state current level suitable for producing on the imaging screen 22 a sharply defined display pattern having adequate brightness, relative to ambient illumination conditions, for viewing easily through the faceplate 20. Also, a modulating signal voltage source 68 may be electrically connected through a capacitor 67 to the conductor 66 for varying the bias potential of control grid cup 44 in a manner suitable for "writing" corresponding informational data in the visible pattern displayed on the imaging screen 22 and viewed through the adjacent transparent faceplate 20.

If ambient illumination conditions decrease, such as from daylight to moonlight conditions, for example, the relative brightness of the display pattern on imaging screen 22 will appear excessively bright and the informational data in the pattern may become blurred, when viewed through the faceplate 20. Accordingly, the tap 75 may be adjusted to increase the magnitude of the negative bias potential on grid cup 44 to reduce the electron current passing from cathode cup 42 into the beam impinging on imaging screen 22. As a result, the display pattern on imaging screen 22 will decrease in brightness relative to ambient illumination and the informational data in the pattern may become more sharply defined, as viewed through faceplate 20. On the other hand, if the ambient illumination conditions increase, such as from moonlight to daylight conditions, for example, the relative brightness of the display pattern on imaging screen 22 will decrease and the informational data in the pattern may become unreadable, when viewed through the faceplate 20. Accordingly, the tap 75 may be adjusted to decrease the magnitude of the negative biasing potential on grid cup 44 to increase the electron current passing from cathode cup 42 into the beam impinging on imaging screen 22. As a result, the display pattern on imaging screen 22 will increase in brightness relative to the ambient illumination and the informational data in the pattern may become more readily readable through the faceplate 20.

In prior art cathode tube control systems, the heater 40 generally is connected to an external current source which supplies sufficient electrical current to the heater for heating the cathode cup 42 up to a predetermined temperature. The temperature of the heated cathode cup 42 usually is chosen to ensure that a copious emission therefrom will be constantly available during operation of the tube for producing a relatively bright display pattern under specified maximum illumination conditions. However, since the tube may not be constantly operated under the maximum illumination conditions, the described mode of compensating for changes in ambient illumination unnecessarily depletes the electron emission capacity of the cathode and decreases the operational life of the tube.

Consequently, the external circuitry 11 is provided with an adjustable current supply 76 electrically connected through the respective terminal pins 34 and 35 to the filamentary heater 40 and coupled to sensing means 78 for adjusting the electron emission of cathode cup 42 in accordance with adjustments in electron beam current. The adjustable current supply 76 may comprise a conventional source 80 of electrical current having a terminal 81 electrically connected to the terminal pin 35 and another terminal 82 electrically connected through a variable resistive device 86 to the terminal pin 34. The device 86 may comprise a rheostat resistive element 85 having one end connected to the terminal 82 of source 80 and slidably contacted by a rheostat wiper arm 84 which is connected to the terminal pin 34. The wiper arm 84 is coupled to the adjustable tap 75 by sensing means 78 which may comprise conventional mechanical coupling linkage for moving the wiper arm 84 in unison with the tap 75. Thus, when electron beam current is adjusted by moving the tap 75, the wiper arm 84 is moved accordingly thereby varying the current flowing through heater element 40 and adjusting the electron emission capability of cathode cup 42 correspondingly.

As shown in FIG. 2, the magnitude of the negative bias potential Ug (in volts) of the control grid cup 44 with respect to cathode cup 42 may be plotted against the effective resistance value R (in ohms) of the coupled resistive element 85 when the tap 75 is adjusted. The solid line curve 88 indicates the approximate relation of Ug to R when the bias potential of grip cup 44 varies logarithmically and the effective resistance value of element 85 varies linearly with adjustment of the tap 75. The dashed line curve 89 indicates the relation of Ug to R when the bias potential of grid cup 44 and the effective resistance value of element 85 vary linearly with adjustment of tap 75. A comparison of the respective curves 88 and 89 discloses that below a predetermined magnitude of biasing potential Ug, such as forty-five volts, for example, the effective resistance value R on curve 88 for a given magnitude of biasing potential, such as thirty volts, for example, is less than the corresponding resistance value R on curve 89. Consequently, when operating under the conditions represented by curve 89, an increase in the magnitude of the biasing potential Ug from zero up to a desired value, such as thirty volts, for example, may cause an excessive increase in the effective resistance of element 85. The resulting decrease in heater current may result in a cathode temperature insufficient to provide the desired electron beam current for producing a viewable display pattern on imaging screen 22. Accordingly, it may be preferable that the biasing potential of grid cup 44 vary approximately logarithmically and the effective resistance of element 85 vary substantially linearly with the adjustment of tap 75.

Figure 3:
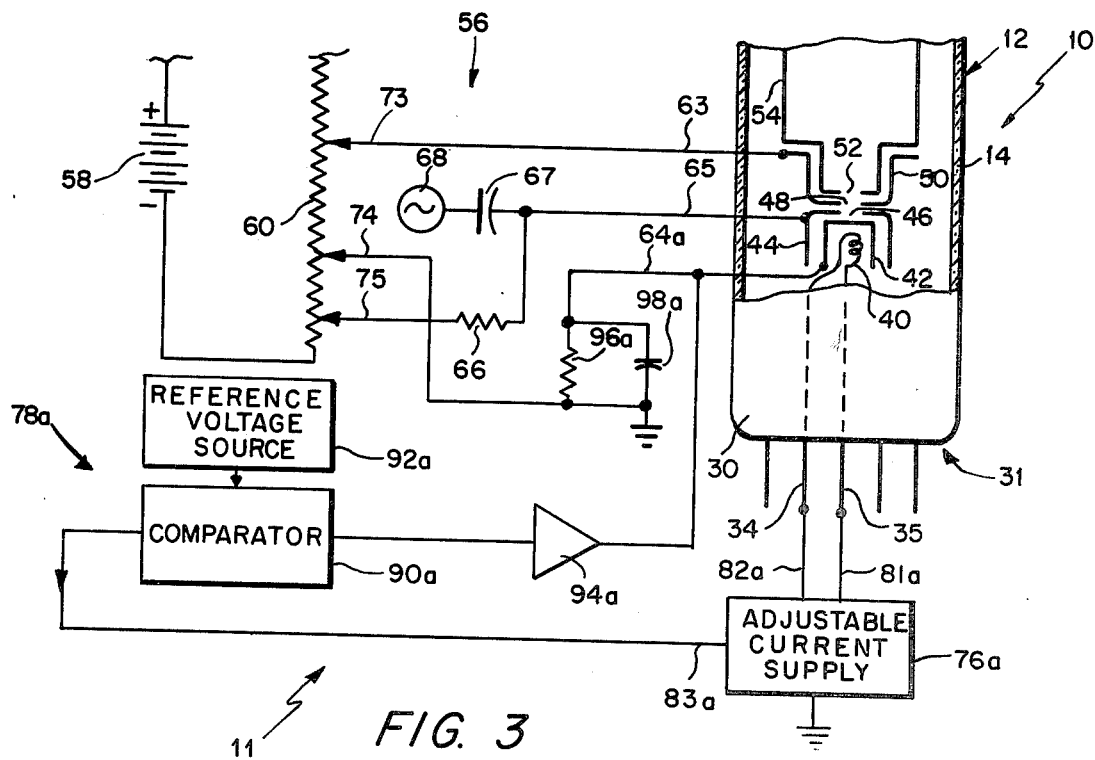
FIG. 3 is a fragmentary schematic view of an alternative embodiment of the invention.

In FIG. 3, there is shown an alternative embodiment which is similar to the embodiment shown in FIG. 1 except the heater element 40 is electrically connected to an adjustable current supply 76a which is coupled electrically to the cathode cup 42 through a sensing means 78a, and is responsive to changes in a voltage input signal received therefrom. The current supply 76a is of a conventional type such as Model No. QRD 15-2 made by Sorensen Company, a subsidary of Raytheon Company of Lexington, Mass., for example, and has terminals 81a and 82a electrically connected through respective terminal pins 35 and 34 to opposing end portions of the filamentary heater element 40. The sensing means 78a comprises a conventional comparator 90a having an output terminal electrically connected to an input terminal 83a of the current supply 76a, and an input terminal connected to an output of a conventional reference voltage source 92a. Another input terminal of comparator 90a is electrically connected through a conventional amplifier 94a to a conductor 64a which is connected electrically to cathode cup 42, a junction of a parallel resistor 96a and capacitor 98a network, and the adjustable tap 74 of voltage supply means 56. The other junction of the parallel resistor 96a and capacitor 98a network is connected to electrical ground.

Thus, the electron beam current passing from cathode cup 42 to the anode imaging screen 22 within the envelope 12 of tube 10 returns through anode conductor 61, potentiometer resistive element 60, and cathode conductor 64a. As a result, adjustments in the electron beam current are sensed as variations in the voltage developed across resistor 96a, which variations are smoothed by the capacitor 98a and applied as an average signal voltage to the connected input terminal of comparator 90a. In comparator 90a, the average signal voltage is compared with the reference signal voltage from source 92a to obtain a control signal voltage which is applied to the connected input terminal of adjustable current supply 76a. Consequently, the current supply 76a automatically adjusts the current flowing through heater element 40 to alter the cathode temperature and electron emission capability in accordance with the senses adjustment in electron beam current.

In FIG. 4, there is shown a second alternative embodiment which is similar to the first alternative embodiment shown in FIG. 3 except input terminal 83a of adjustable current supply 76a is coupled electrically through a sensing means 78b to the grid cup 44 rather than the cathode cup 42. The sensing means 78b comprises a conventional comparator 90b having an output terminal connected to the input terminal 83a of adjustable current source 76a, and an input terminal connected to the output of a reference voltage source 92b. Another input terminal of comparator 90b is connected through a conventional amplifier 94b to an output of a light sensitive means 100b, such as a conventional photoelectric transducer unit, for example, which is connected in electrical series between the adjustable tap 75 and grid bias resistor 66.

Thus, the light sensitive means 100b senses substantial changes in ambient illumination conditions and modifies the biasing potential applied from the grid tap 75 to the grid cup 44 accordingly. As a result, the electron beam current in tube 10 is adjusted automatically to provide on imaging acreen 22 a display pattern having a brightness more suitable for the ambient illumination environment. The adjusted biasing potential also is applied through the amplifier 94b to the connected input terminal of comparator 90b, wherein it is compared with a reference voltage signal from source 92b to produce an output control signal voltage. The output control signal voltage is applied to the input terminal 83a of adjustable current supply 76a which adjusts the current flowing through heater element 40 accordingly, as described.

Consequently, the cathode temperature and electron emission capability is adjusted in accordance with the sensed adjustment in electron beam current.

Thus, there has been disclosed herein a cathode ray tube control system comprising a cathode ray type tube connected to external circuitry having means for adjusting the emission capability of electron emitting source within the tube in accordance with adjustments in the biasing potential of adjacent control grid means. The electron emitting source may be an indirectly heated cathode, as shown herein, or a directly heated cathode. Also, the heater current supplied to the cathode heater 40 may be unidirectional current or oscillatory current, since it is the heating effect of the current which is important rather than the instantaneous value thereof.

From the foregoing, it may be seen all of the objectives of this invention have been achieved by the cathode tube control system disclosed herein. However, it also will be apparent that various changes may be made by those skilled in the art without departing from the spirit of the invention as expressed in the appended claims. It is to be understood, therefore, that all matter shown and described herein is to be interpreted in an illustrative rather than in a limiting sense.

What is claimed is:

1. A cathode ray tube control system comprised of
a cathode ray type tube including:
an evacuated envelope,
electron source means disposed within the envelope for producing a thermal emission of electrons therefrom, and
beam forming electrode means aligned within the envelope with the electron source means for directing electrons into a beam; and
control circuitry disposed externally of the tube and including:
variable voltage supply means connected electrically between the electron source means and the beam forming electrode means for maintaining the electrode means at selected electrical potentials with respect to the potential of the electron source means and controlling the beam current,
adjustable current supply means connected electrically to the electron source means for supplying a heating current thereto and controlling thermal emission of electrons therefrom, and
sensing means coupled to the variable voltage supply means and to the adjustable current supply means for adjusting the emission of electrons from the source means in accordance with the beam current.

2. A cathode ray tube control system as set forth in claim 1 wherein the sensing means includes beam current sensing means connected in electrical series with the variable voltage supply means and the electron source means for developing a voltage signal corresponding to the beam current.

3. A cathode ray tube control system as set forth in claim 2 wherein the beam current sensing means includes a resistive element having one portion connected to electrical ground and to the variable voltage supply means, and a spaced portion electrically connected to the electron source means.

4. A cathode ray tube control system as set forth in claim 2 wherein the sensing means includes voltage sensing means electrically connected between the beam current sensing means and the adjustable current supply means for receiving the voltage signal from the beam current sensing means and producing a corresponding control signal for the current supply means.

5. A cathode ray tube control system as set forth in claim 2 wherein the voltage sensing means includes comparator means having one input terminal connected to the beam current sensing means and another input terminal connected to a reference voltage source for comparing the voltage signal developed by the beam current sensing means with a voltage signal from the reference voltage source and producing the control signal for the current supply means.

6. A cathode ray tube control system as set forth in claim 1 wherein the beam forming electrode means includes a control grid electrode disposed adjacent the electron source means; and the variable voltage supply means includes adjustable bias potential means electrically connected between the control grid and the electron source means for adjusting the electrical potential of the control grid with respect to the electrical potential of the electron source means.

7. A cathode ray tube control system as set forth in claim 6 wherein the sensing means includes light sensing means connected in electrical series with the adjustable bias potential means and the control grid for sensing ambient illumination and adjusting the electrical potential of the control grid with respect to the electron source means accordingly.

8. A cathode ray tube control system as set forth in claim 7 wherein the sensing means includes voltage sensing means connected electrically between the light sensing means and the adjustable current supply means for receiving from the light sensing means a voltage signal corresponding to the adjusted electrical potential of the control grid and producing a corresponding control signal for the current supply means.

9. A cathode ray tube control system as set forth in claim 8 wherein the voltage sensing means includes comparator means having one input terminal connected to the light sensing means and another input terminal connected to a reference voltage source for comparing the voltage signal from the light sensing means with the voltage signal from the reference voltage source and producing the control signal for the current supply means.

10. A cathode ray tube control system as set forth in claim 6 wherein the adjustable bias potential means includes a movable member electrically connected to the control grid; the adjustable current supply means includes a movable member electrically connected to the electron source means; and the sensing means includes coupling means connected to the respective movable members for adjusting the heating current supplied to the electron source means and the biasing potential of the control grid in unison with one another.

11. A cathode ray tube control system as set forth in claim 10 wherein the adjustable bias potential means includes a potentiometer resistive element and the movable member comprises a potentiometer wiper arm means disposed in slidable contact with the resistive element for adjusting the bias potential of the control grid.

12. A cathode ray tube control system as set forth in claim 11 wherein the potentiometer resistive element includes an electrically positive portion connected to the electron source means and a relatively negative portion electrically connected through the potentiometer wiper arm means to the control grid.

13. A cathode ray tube control system as set forth in claim 12 wherein the adjustable current supply means includes an effective portion of a rheostat resistive element and the movable member comprises a rheostat wiper arm means disposed in slidable contact with the resistive element for varying the effective portion thereof.

14. A cathode ray tube control system as set forth in claim 13 wherein the sensing means includes mechanical means coupled to the respective wiper arms of the adjustable bias potential means and the adjustable current supply means for sensing adjustments in the bias potential of the control grid and varying the effective portion of the rheostat resistive element accordingly.

15. A cathode ray tube control system as set forth in claim 13 wherein the sensing means includes mechanical linkage means connected to the respective wiper arms of the adjustable bias potential means and the adjustable current supply means for sensing substantially logarithmic adjustments in the bias potential of the control grid and varying the effective portion of the rheostat resistive element with respect thereto in a substantially linear manner.

* * * * *